United States Patent Office 3,432,598
Patented Mar. 11, 1969

3,432,598
ANTIBIOTIC SL 2266
Hans-Peter Sigg, Binningen, and Christian Stoll, Basel, Switzerland, assignors to Sandoz Ltd. (also known as Sandoz AG), Basel, Switzerland
Continuation-in-part of application Ser. No. 598,090, Nov. 30, 1966. This application Nov. 30, 1967, Ser. No. 686,958
Claims priority, application Switzerland, Dec. 6, 1965, 16,791/65
U.S. Cl. 424—122   2 Claims
Int. Cl. C07g 11/00; A61k 21/00

ABSTRACT OF THE DISCLOSURE

A new antibiotic SL 2266, and its salts, is provided. It is prepared by cultivating a new strain of the fungus species Sordaria araneosa. The antibiotic has fungistatic activity and is used as a disinfectant in e.g., wash solutions. It also has an inhibiting effect on the increase of tumour cells in vitro and may be used to restrict offshoots from the tumours in the transplantation of tumours.

---

Figure 1:
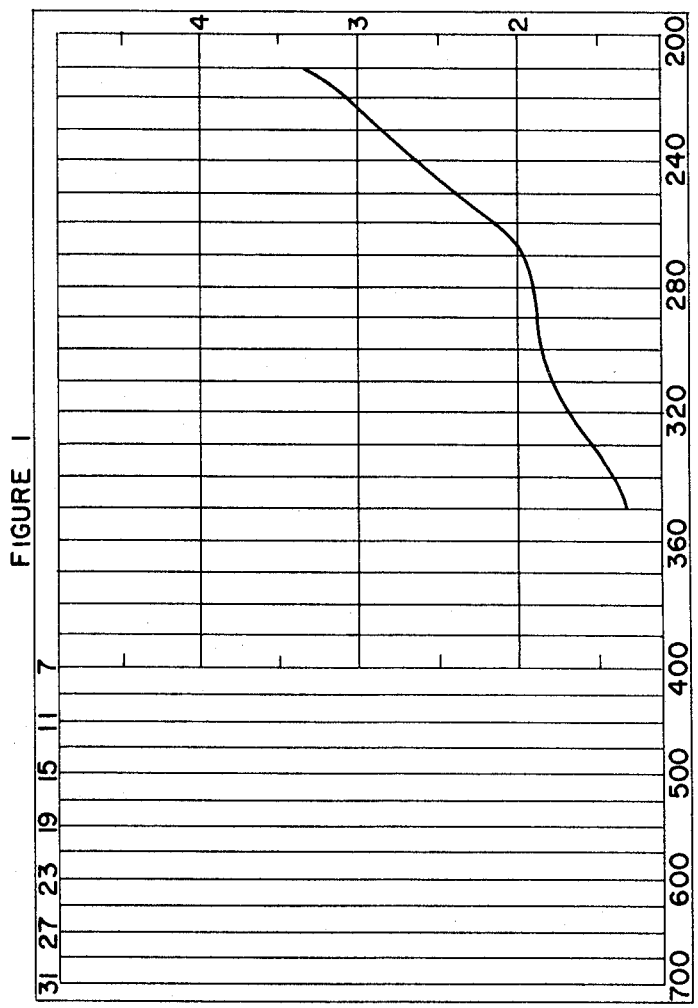

This is a continuation in part of our application Ser. No. 598,090 filed Nov. 30, 1966, now abandoned. The invention relates to a new antibiotic and a process for its production.

The present invention provides a new antibiotic, hereinafter named SL 2266, and its salts with suitable organic and inorganic bases.

The present invention further provides a process for the production of SL 2266 and its salts, characterized in that a new strain of the fungus species Sordaria araneosa is cultivated in a nutrient solution and the said antibiotic is isolated from the culture medium and purified in manner known per se, e.g. by extraction or adsorption, and optionally converted into its salts by reacting with suitable organic and inorganic bases in manner known per se.

The new strain of the fungus species Sordaria araneosa Cain was isolated from a jungle soil sample from Dartonfield (Ceylon) and a specimen of this strain has been deposited with the United States Department of Agriculture (Northern Utilization Research and Development Division), Peoria, Ill., U.S.A., under the reference NRRL 3196.

The new strain corresponds morphologically to the description of the fungus species made by Roy F. Cain, University of Toronto Studies, Biological series, No. 38, 1934.

The fungus strain NRRL 3196 of the fungus species Sordaria araneosa forms a brownish substrate mycelium and a thin, light aerial mycelium when cultivated on a malt/yeast extract agar. On sterilized feces samples it grows at 27° with the formation of a compact, furry, grey-white coloured aerial mycelium. The bottle-shaped, submerged or partially superficial perithecia measure 550–700μ. They are light brown and are covered by compact, long septalized hairs. The club-shaped asci have about 250 spores each and measure 300–350 x 52–63μ. The ascospores are formed in many rows and measure 11–14 x 6.5–8μ. As the ripening process progresses they turn dark brown and are opaque.

They are ellipsoidal and have a primary hyaline appendage (9 x 3μ) and a secondary appendage (6.5–8 x 2μ) on one end and only a secondary appendage on the other end.

It is also possible to produce the antibiotic SL 2266 using strains which may be obtained from the above mentioned strain of Sordaria araneosa Cain, for example, by selection or mutation by ultraviolet or X-ray irradiation or other measures, for example by treatment of laboratory cultures with suitable chemicals.

The new strain of Sordaria araneosa Cain may be cultivated on various nutrient media containing the usual nutrients. Suitable nutrients for this fungus strain are, for example, nutrients normally used for carbon-heterotrophic organisms; specific examples of the carbon source are glucose, stretch, dextrin, lactose and cane sugar; organic or inorganic nitrogen containing compounds may be used as the nitrogen source, specific examples being peptone, yeast and meat extracts, ammonium sulphate, ammonium nitrate and amino acids; the usual mineral salts and trace elements are also suitable for use in the nutrients.

One method of producing the antibiotic SL 2266 consists of inoculating a liquid nutrient medium with conidia or mycelia of the new strain of Sordaria araneosa Cain. The cultivation may, for example, be effected under aerobic conditions in static surface culture or in submerged culture while shaking or in fermenters while aerating with air or oxygen whilst stirring. The incubation temperature may be 20° to 35° C. It is preferred, however, to use a temperature between 20° and 30° C. and a pH value of 5 to 7, in which case the culture is incubated for 4 to 10 days.

The new antibiotic is isolated, preferably by extracting the culture filtrate with ethylene chloride and the mycelium with methanol, but other organic solvents, e.g. benzene, ethyl acetate, butyl acetate, chloroform and acetone, may likewise be used. The extracts are subsequently concentrated and the active compound extracted with water having a pH value of 8–10. The alkaline phases are acidified to a pH of 2–5, and extracted with an organic solvent, e.g. ethyl acetate. The solvent is removed from the extract, whereupon the crude antibiotic is obtained; this is further purified chromatographically on adsorbing agents, e.g. activated alumina, silica gel and ion exchange resins, by counter current distribution or by precipitation.

The antibiotic SL 2266 has the following characteristics: SL 2266 is an amorphous, colourless acid having the formula $C_{27}H_{40}O_8$ and a specific rotation of $[\alpha]_D^{20} = -45°$ (c.=0.57 in ethanol).

Figure 2:
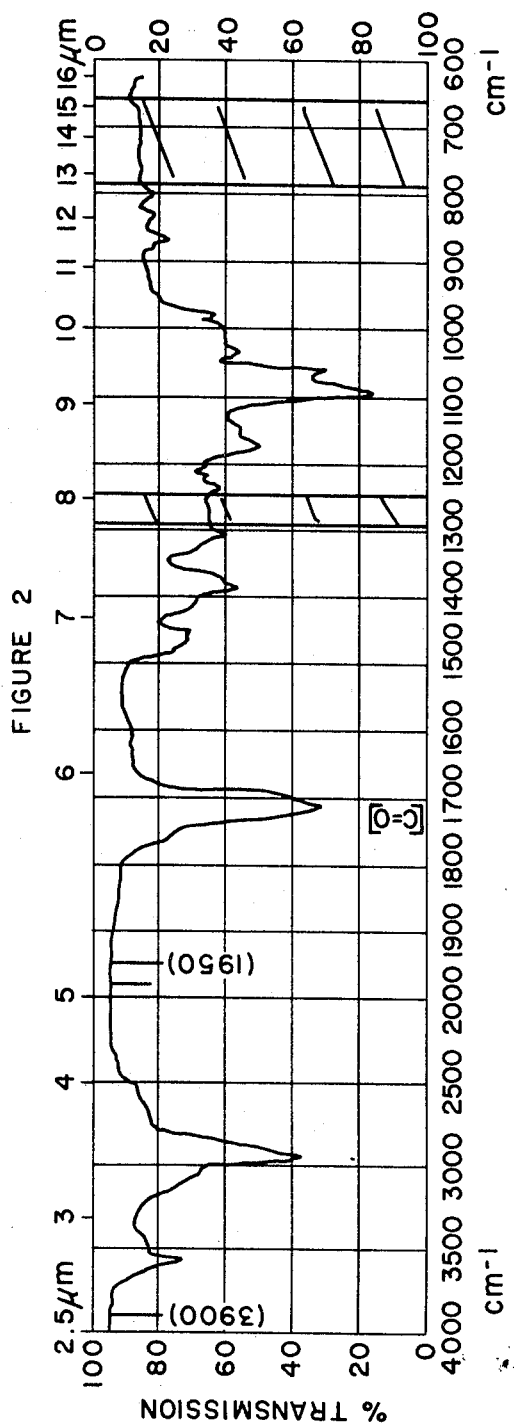

Ultraviolet spectrum: shoulder at 300 mμ (log ε=1.84) (in methanol) (Figure 1).
Infrared spectrum: inter alia bands at 3550, 2950, 1710, 1460, 1390, 1310, 1170, 1090, 1060, 1030, 980, 870 cm.$^{-1}$ (in $CH_2Cl_2$) (Figure 2).

The potassium salt of SL 2266 forms colourless crystals having a melting point of 253–255° and a specific rotation of $[\alpha]_D^{20} = -50°$ (c.=0.48 in water).

Figure 3:
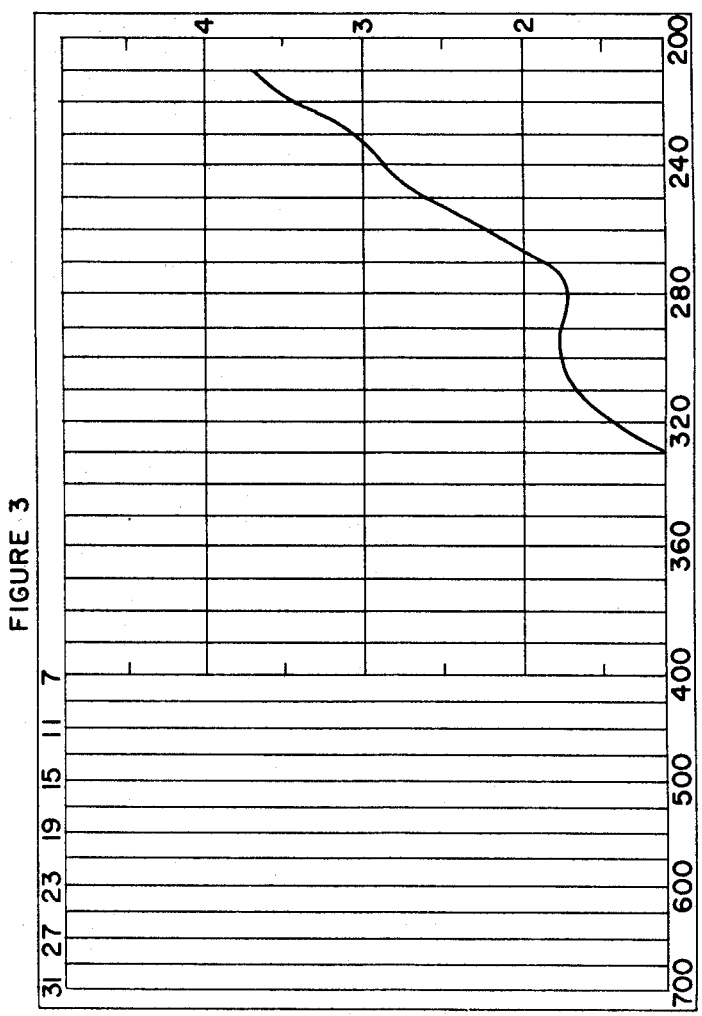
Figure 4:
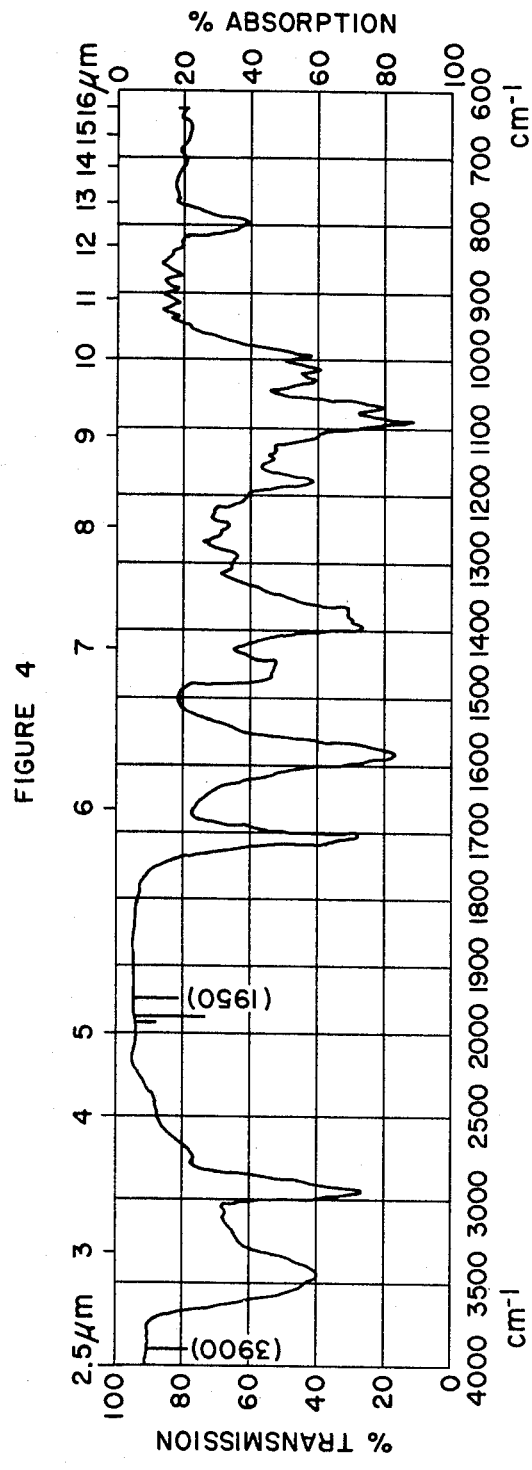

Ultraviolet spectrum: maximum at 295 mμ (log ε=1.78) (in methanol) (Figure 3).
Infrared spectrum: inter alia bands at 3450, 2950, 1705, 1580, 1470, 1450, 1400, 1180, 1090, 1060, 1025, 1010, 90, 795$^{-1}$ (1 mg./300 mg. KBr) (FIGURE 4).

The antibiotic SL 2266 is a disinfectant which has a fungistatic activity. It is especially effective against phycomycetes e.g. *Absidia cylindrospora*, *Absidia orchidis* and *Rhizopus oryzae*, known to produce mucormycosis. SL 2266 is even more effective against various yeasts which cause candidiasis, e.g. *Candida albicans* and *Candida tropicalis*. The antibiotic furthermore shows a good activity against fungi which cause histoplasmosis, e.g. *Histoplasma capsulatum*. In view of the fungistatic activity of SL 2266, it is readily applied to sites where the above-noted fungi are found. It is, e.g. incorporated in the form of its water soluble potassium salt, in wash water for scrubbing walls or floors. The antibiotic itself is rendered soluble by surface active agents such as "Tween 80" (sorbitan monooleate polyoxyalkylene derivative) and may therefore alternatively be incorporated in such surface active agents. The said aqueous or detergent solutions suitably contain 0.1 to 5% of the antibiotic. It can also be sprayed in an infected area or dusted, e.g. in the form of its potassium salt, on a substrate contaminated with any of the above-noted fungi. For this purpose it is mixed with an inert, solid carrier, e.g. starch or talc, to give a concentration of the antibiotic of 1 to 5%.

In the agar diffusion hole test, inhibition area diameters of at least 20 mm. (hole diameter 7 mm.) were ascertained, using the following amounts of antibiotic:

| Organism | Strain No. | Necessary amount of antibiotic dissolved in 0.1 ml. of 5% methanol (µg.) |
|---|---|---|
| *Absidia cylindrospora* | S 740 | 10 |
| *Absidia orchidis* | S 2381 | 100 |
| *Rhizopus oryzae* | S 2058 | 100 |
| *Candida albicans* | S 1254 | 1 |
| *Candida tropicalis* | S 1256 | 1 |
| *Cryptococcus neoformans* | S 1258 | 100 |
| *Saccharomyces cerevisiae* | S 8 | <1 |
| *Histoplasma capsulatum* | S 3095 | 30 |

TEST METHOD 20 ml. of sterilized nutrient medium having a temperature of 45° C., containing 2% of malt extract (Schweiz. Ferment AG, Basel), 0.75% of Ionagar No. 2 (Oxoid Div. of Oxo Ltd. London SE 1) and demineralized water are poured into sterile Petri dishes After the basic layer has solidified, 5 ml. of a sterilized germinating layer consisting of the same medium as the basic layer, to which a suspension of spores of $10^6$ spores of the test fungus has been added after cooling to 40° C., is placed on the basic layer. Holes having a diameter of 7 mm. are punched into the solidified agar plates under sterile conditions and after removing the punched agar piece the test samples are transferred to pipettes in portions of 0.10 ml. The test plates are subsequently incubated at 27–37° C. in an incubator for 1–4 days until the fungi show an abundant growth. The average diameters of the inhibition areas (areas without growth) of several parallel tests are measured.

The antibiotic SL 2266 does not show a detrimental effect towards the increase of bacteria, so that its specific effect against fungi is more pronounced.

SL 2266 also has a strong inhibiting effect on the increase of tumour cells as determined by the inhibition of the increase of tumour cells (mouse mastocytoma P 815) in vitro. The DE–50 of SL 2266 towards these cells is 0.1 µg/ml. SL 2266 is characterized by a low toxicity. The acute toxicity of SL 2266 in white mice amounts to a DL–50 which is greater than 250 mg./kg. i.v. or per os. It may therefore be used, in the transplanting of tumours, to restrict off-shoots from the tumour both prior to and immediately after transplanting by contacting the surface of the tumours being transplanted with, e.g. a solution of the antibiotic in ethanol.

The term "in manner known per se" as used herein designates methods in use or described in the literature on the subject.

In the following non-limitative examples all temperatures are indicated in degrees centigrade. The melting points were determined on a Kofler block.

Example 1

| | G. |
|---|---|
| 10 litres of a nutrient solution containing | |
| Glucose | 20 |
| Malt extract (Schweiz. Ferment AG) | 2 |
| Peptone | 2 |
| Bacto-yeast extract (Difco) | 2 |
| $KH_2PO_4$ | 2 |
| $MgSO_4 \cdot 7H_2O$ | 2 | and
Demineralized water to make up one litre.

are inoculated in a fermenter (New Brunswick Co., U.S.A,. type FS 314) with a suspension of spores of *Sordaria araneosa*, strain NRRL 3196 and incubated at 27° for 144 hours whilst aerating (10 litres of air per minute) and stirring (300 revolutions per minute). The culture solution is filtered and the filtrate having a pH of 4–6 is extracted five times, each time with 6 litres of ethylene chloride. The mycelium is extracted four times, each time with 5 litres of 90% methanol, the methanol is removed from the extract and the aqueous phase extracted five times, each time with 0.5 litre of ethylene chloride. All the ethylene chloride extracts are combined and concentrated in a vacuum to $\frac{1}{10}$ of their volume. The concentrate is extracted thrice, each time with 0.5 litre of cold 2 N sodium hydroxide, the pH value of the combined basic extracts is adjusted to 2–3 by the addition of hydrochloric acid (1:1) at 0° and extraction is effected thrice, each time with 1 litre of ethylene chloride. These extracts are dried over magnesium sulphate and dried in a vacuum, whereby 1.5 g. of crude SL 2266 result as a slightly brownish foam. 1.5 g. of crude SL 2266 are chromatographed on 60 g. of silica gel. Elution (volume of fraction 30 ml.) with chloroform/glacial acetic acid (98.5:1.5) yields 0.8 g. of pure, colourless SL 2266 from fractions 13–75.

Example 2.—Potassium salt of SL 2266

1.66 g. of SL 2266 are dissolved in 40 ml. of methanol/water (1:1) and titrated with 0.5 N potassium hydroxide until a pH of 7.0 is obtained. The solution is filtered over a thin layer of active charcoal and dried in a vacuum. Crystallization of the residue from ethyl acetate/methanol yields colourless crystals of the potassium salt having a melting point of 253–255°.

Example 3.—Sodium salt of SL 2266

0.50 g. of SL 2266 are dissolved in 50 ml. of methanol/water (1:1) and titrated with 0.1 N sodium hydroxide until a pH of 7.0 is obtained. The solution is filtered over a thin layer of active charcoal and dried in a vacuum. After triturating with ether the sodium salt is obtained in the form of a colourless powder.

What is claimed is:
1. Antibiotic SL 2266 having the following characteristics: an amorphous, colourless acid having the formula $C_{27}H_{40}O_8$ and a specific rotation of $[\alpha]_D^{20} = -45°$ (c.=0.57 in ethanol), and showing the following bands in the ultraviolet as shown in FIGURE 1 and infrared spectrum as shown in FIGURE 2:

Ultraviolet spectrum: shoulder at 300 mµ (log=1.84) (in methanol),

Infrared spectrum: inter alia bands at 3550, 2950, 1710, 1460, 1390, 1310, 1170, 1090, 1060, 1030, 980, 870 cm.$^{-1}$ (in $CH_2Cl_2$).

2. The potassium salt of antibiotic SL 2266 claimed in claim 1.

References Cited

UNITED STATES PATENTS 3,334,015   8/1967   Schmitz _____ 167—65

ALBERT T. MEYERS, *Primary Examiner.*

J. D. GOLDBERG, *Assistant Examiner.*